United States Patent [19]

Payne et al.

[11] Patent Number: 5,026,971
[45] Date of Patent: Jun. 25, 1991

[54] TEMPERATURE CONTROL SYSTEM FOR A HEATING OVEN USING A GLASS-CERAMIC TEMPERATURE SENSOR

[75] Inventors: Thomas R. Payne; John Schultz, both of Louisville, Ky.

[73] Assignee: General Electric Company, Louisville, Ky.

[21] Appl. No.: 462,112

[22] Filed: Jan. 8, 1990

[51] Int. Cl.[5] .............................................. H05B 1/02
[52] U.S. Cl. ................................. 219/483; 219/497; 219/505; 219/501; 219/413
[58] Field of Search ............................ 219/450–452, 219/464, 483, 485, 486, 501, 497, 494, 505, 408, 413; 307/38–41; 432/51

[56] References Cited

U.S. PATENT DOCUMENTS

| | | | |
|---|---|---|---|
| 3,006,775 | 10/1961 | Chen | 106/39 |
| 3,720,900 | 3/1973 | Von Bruning | 338/25 |
| 3,786,390 | 1/1974 | Kristen | 338/22 R |
| 3,819,960 | 6/1974 | Kohn et al. | 219/494 |
| 4,050,052 | 9/1977 | Reichelt et al. | 338/308 |
| 4,103,275 | 7/1978 | Diehl et al. | 338/25 |
| 4,139,833 | 2/1979 | Kirsch | 338/308 |
| 4,237,368 | 12/1980 | Welch | 219/449 |
| 4,282,507 | 8/1981 | Tindall et al. | 338/25 |
| 4,323,763 | 4/1982 | Goldsmith | 219/497 |
| 4,375,056 | 2/1983 | Baxter et al. | 338/25 |
| 4,495,405 | 1/1985 | Foster | 219/501 |
| 4,554,439 | 11/1985 | Cross et al. | 219/497 |
| 4,719,442 | 1/1988 | Bohara et al. | 338/25 |
| 4,745,263 | 5/1988 | Brooks | 219/497 |
| 4,791,398 | 12/1988 | Sittler et al. | 338/25 |
| 4,816,647 | 3/1989 | Payne | 219/464 |
| 4,899,034 | 2/1990 | Kadwell et al. | 219/497 |

*Primary Examiner*—M. H. Paschall
*Attorney, Agent, or Firm*—H. Neil Houser; Radford M. Reams

[57] ABSTRACT

A temperature control system incorporating a temperature sensor characterized by thermal inertia which causes the sensed temperature to lag the actual temperature during the transition from one operating temperature for the controlled environment to a different operating temperature. This control system controls temperature as a function of setpoint temperature and the value of a temperature control variable representing the sensed temperature. The value of the temperature control variable is set equal to the temperature sensed by the sensor during steady state operating conditions. In response to a change in setpoint temperature, the system adjusts the value of the temperature control variable to compensate for the thermal lag of the sensor.

22 Claims, 6 Drawing Sheets

TEMPERATURE CONTROL SYSTEM FOR A HEATING OVEN USING A GLASS-CERAMIC TEMPERATURE SENSOR

BACKGROUND OF THE INVENTION

This invention relates generally to electronic temperature control systems for heating apparatus and more particularly to control systems incorporating temperature sensors characterized by a thermal inertia sufficient to cause the sensed temperature to significantly lag the actual temperature during changes in temperature.

A novel temperature sensor for use in an electronic temperature control system applicable to domestic cooking ovens and also to industrial heating ovens is disclosed in co-pending commonly assigned U.S. patent application Ser. No. 462,110, filed Jan. 8, 1990, the Specification of which is hereby incorporated by reference. The sensor comprises a plurality of conductive elements deposited on a glass-ceramic substrate. Temperature is measured over at least a substantial portion of the operating range for the sensor as a function of the resistance of the substrate material. Thermal inertia of the glass-ceramic material introduces a lag in the sensor's response to substantial changes in operating temperature such as may occur following a change in the set point temperature for the controlled environment from a relatively low temperature to a relatively high temperature. This lag could result in temperature overshoots which adversely affect oven cooking performance. Such a lag is even greater in those industrial oven applications requiring tighter control of temperature than is required for typical domestic cooking ovens.

It is therefor a principle object of the present invention to provide an electronic control system which is compatible with the novel temperature sensor of the aforementioned type and which compensates for the thermal lag to prevent such overshoot.

SUMMARY OF THE INVENTION

A temperature control system having input means for establishing the setpoint temperature for a controlled environment such as an oven, and incorporating a temperature sensor characterized by thermal inertia which causes the sensed temperature to lag the actual temperature during the transition from one operating temperature for the controlled environment to a different operating temperature. The control system includes control means responsive to the input means and the temperature sensor means for controlling the temperature of the controlled environment. This control means controls temperature as a function of setpoint temperature and the value of a temperature control variable representing the sensed temperature. The value of the temperature control variable is set equal to the temperature sensed by the sensor during steady state operating conditions as would be the case in conventional control systems. In accordance with the improvement of the present invention the control means further includes compensating means operative in response to a change in setpoint temperature to adjust the value of the temperature control variable to compensate for the thermal lag of the sensor. By this arrangement the control means controls the temperature of the controlled environment as a function of the actual sensed temperature under steady state operating conditions and as a function of a temperature value adjusted to compensate for the thermal lag inherent in the temperature sensing means in response to a change in setpoint temperature.

In accordance with a preferred form of the invention, the controlled environment is a cooking oven and the control system includes temperature sensing means in the form of a plurality of electrodes deposited on a glass-ceramic substrate which senses oven temperature over at least a portion of the operating temperature range as a function of the resistance of the glass-ceramic material. The compensating means gradually increases the value of the temperature control variable at a constant predetermined rate until a predetermined differential is established between the adjusted value and the sensed temperature value in response to an increase in setpoint temperature for the oven and gradually decreases the value of the temperature control variable at a predetermined constant rate greater than said predetermined increase rate when the adjusted value of the temperature control variable exceeds the new setpoint value to compensate for the thermal lag of the sensor.

While the novel features of the invention are set forth with particularity in the appended claims, the invention both as to organization and content will be better understood and appreciated from the following detailed description taken in conjunction with the drawings.

DETAILED DESCRIPTION

Figure 1:
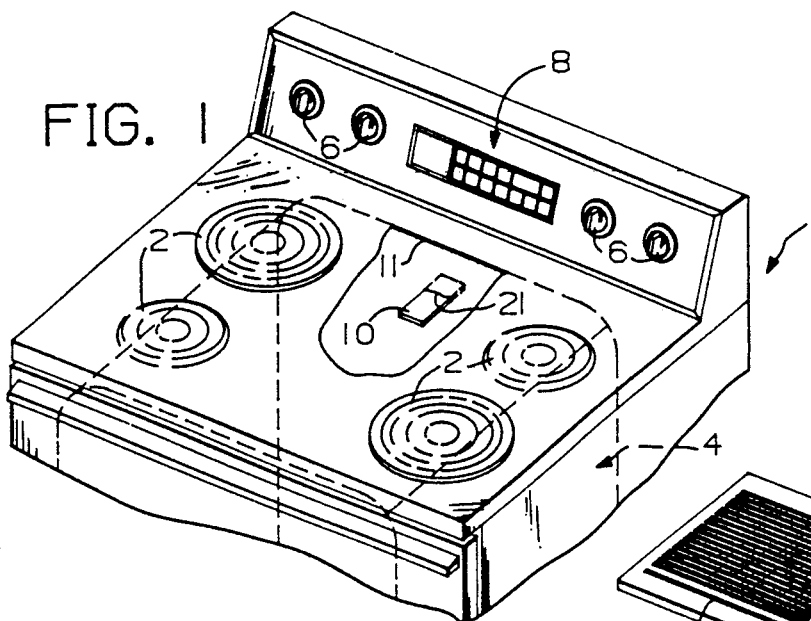
FIG. 1 is a partial perspective view of a domestic range incorporating an oven temperature control system illustratively embodying the temperature control system of the present invention, with portions removed to more clearly schematically illustrate the mounting of the temperature sensor in the oven.

Referring now to FIG. 1, a domestic self-cleaning oven range, designated generally 1, includes surface burners 2 and an oven 4. Heat settings for the surface burners are established by user manipulation of control knobs 6 in conventional fashion. As will be hereinafter described in greater detail, oven operation is controlled by a microprocessor based control system. The user selects the desired oven operating mode and enters the desired set point temperature for the oven via the touch pad and display array designated generally 8. The details of the entry and display portion of the control system are not a part of the present invention and may take a variety of well-known forms. An example of one suitable entry and display arrangement for such application is described in commonly assigned U.S. patent (Ser. No. 267,501, filed 11/4/88), now U.S. Pat. No. 4,902,878, to Smith et al the specification of which is hereby incorporated by reference.

Figure 2:
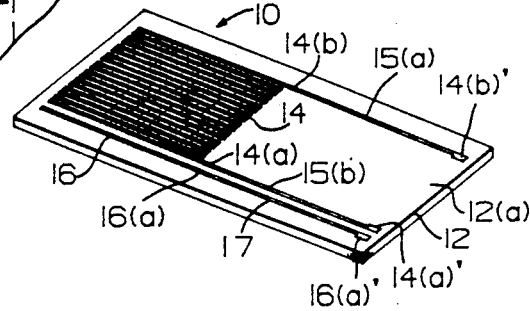
FIG. 2 is a perspective view of the temperature sensor mounted in the range of FIG. 1.
Figure 3A:
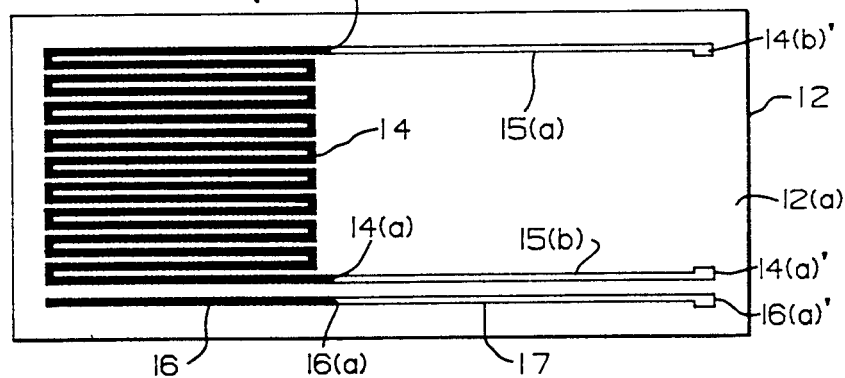
FIGS. 3A and 3B are elevational top and bottom views respectively of the sensor of FIG. 2.
Figure 3B:
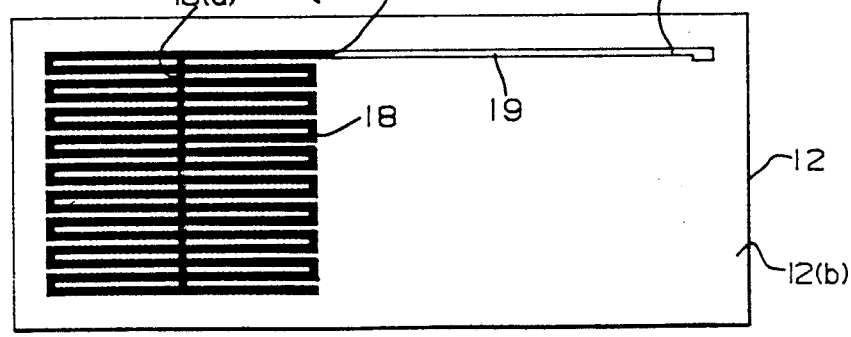

A temperature sensor 10 projects into oven 4 through rear oven wall 11. As best seen in FIGS. 2, 3A and 3B, temperature sensor 10 comprises a generally planar glass-ceramic substrate 12 having a first or upper surface 12(a) and a second or lower surface 12(b), and a plurality of conductive strips 14, 16 and 18. Strips 14 and 16 are deposited on surface 12(a) with strip 18 deposited on surface 12(b), generally opposite and laterally co-extensive with strip 14.

The term "glass-ceramic" as used herein refers to a re-crystallized silicate material characterized by virtually zero thermal expansion and a high thermal coefficient of resistivity such as the Ceran family of materials manufactured by Schott Glaswerke and similar materials manufactured by Nippon Electric Glass Company and Corning Corporation, but it is intended to also include other silicate materials including so-called "doped glass" having comparable thermal coefficient or resistivity characteristics. In particular, in the illustrative embodiment the glass ceramic material comprising substrate 12 is lithium aluminum silicate material designated Ceran-85 manufactured by Schott Glaswerke.

Conductive strip 14 is disposed over the upper surface 12(a) of substrate 12 in a serpentine pattern which terminates at contact points 14(a) and 14(b) at opposite ends thereof. This serpentine pattern permits the necessary strip length to be confined within a limited surface area. Strip 14 is preferably approximately 0.05 inches wide, and 35 inches long with a nominal thickness of 1000 Å. Each length of strip 14 is laterally separated by approximately 0.05 inches. Conductive strip 16 is of comparable width and thickness to strip 14, extending parallel to that leg of strip 14 which terminates in pad 14(b). Strip 16 is separated from this closest portion of strip 14 by approximately 0.3 inches. Conductive strip 18 is applied to surface 12(b) opposite conductive strip 14 in an open pattern similar to the serpentine pattern of strip 14 with the addition of a central shorting strip 18(a) extending the width of the pattern perpendicular to the long legs of the serpentine pattern to better approximate the electrical conductivity of a solid square or rectangular pattern. The open pattern is preferred for strip 18 primarily because it requires less conductive material than a solid pattern over the same area. However, the particular configuration of strip 18 is not critical provided it substantially underlies, i.e. is laterally coextensive with strip 14. For example, it could be a solid pattern having a perimeter comparable to the peripheral dimensions of the serpentine pattern of strip 14. Strip 18 has a single contact point 18(b). Conductive runs 15(a) and 15(b), 17 and 19 connect contact points 14(a), 14(b), 16(a) and 18(b) to terminal pads 14(a)', 14(b)', 16(a)' and 18(b)', respectively, located at the opposite end of substrate 12. In the illustrative embodiment substrate 12 measures approximately 2.7'×5.4'×0.125'. It will be appreciated, however, that other dimensions and substrate configurations could be similarly employed.

Electrical connection of the sensor strips 14, 16, and 18 to external control circuitry is complicated by the high temperature environment presented inside an oven cavity. Soldering is a preferred method of connection for ease of manufacturing and reliability. However soldered connections must be protected from the internal oven temperatures which can approach 1000° F. when operating in the self-cleaning mode. In the illustrative embodiment sensor 10 projects through a slot 19 in the rear wall 11 of oven 4 with the portion of the substrate carrying the serpentine pattern of conductor 14 projecting into the oven, and the terminal pads located in the cooler area outside the oven. Substrate 12 is elongated to facilitate such a mounting arrangement. These terminal pads may then be connected to external control circuitry by conventional soldering techniques.

Conductive strips 14, 16 and 18 may be deposited on substrate 12 by conventionally screen printing a metallo-organic paste commonly referred to as a resinate on the glass ceramic surface in the desired pattern using for example a 200 mesh screen. In the illustrative embodiment a platinum paste designated A4649 available from Engelhard Corporation is used for strips 14, 16 and 18; however, other metal combinations could also be used, provided the material used for strip 14 provides a suitable thermal coefficient of resistivity to allow strip 14 to function as a temperature sensor as hereinafter described. Conductive runs 15(a), 15(b), 17 and 19 may be similarly deposited on substrate 12. However, when sensor 10 is properly mounted these runs will be directly exposed to the significantly lower temperatures outside the oven. Consequently, strips 15, 17 and 19 should be fabricated of a more highly conductive material than strips 14, 16 and 18, such as a palladium silver paste, designated A2519 available from Engelhard Corporation in order to prevent these conductive runs from adversely affecting sensor performance.

Conductive strips 14, 16 and 18 are cooperatively configured in combination with substrate 12 to provide a temperature sensor 10 which includes three sensor configurations. Each configuration operates more effectively over a different portion of the operating temperature range for the oven.

Figure 4:
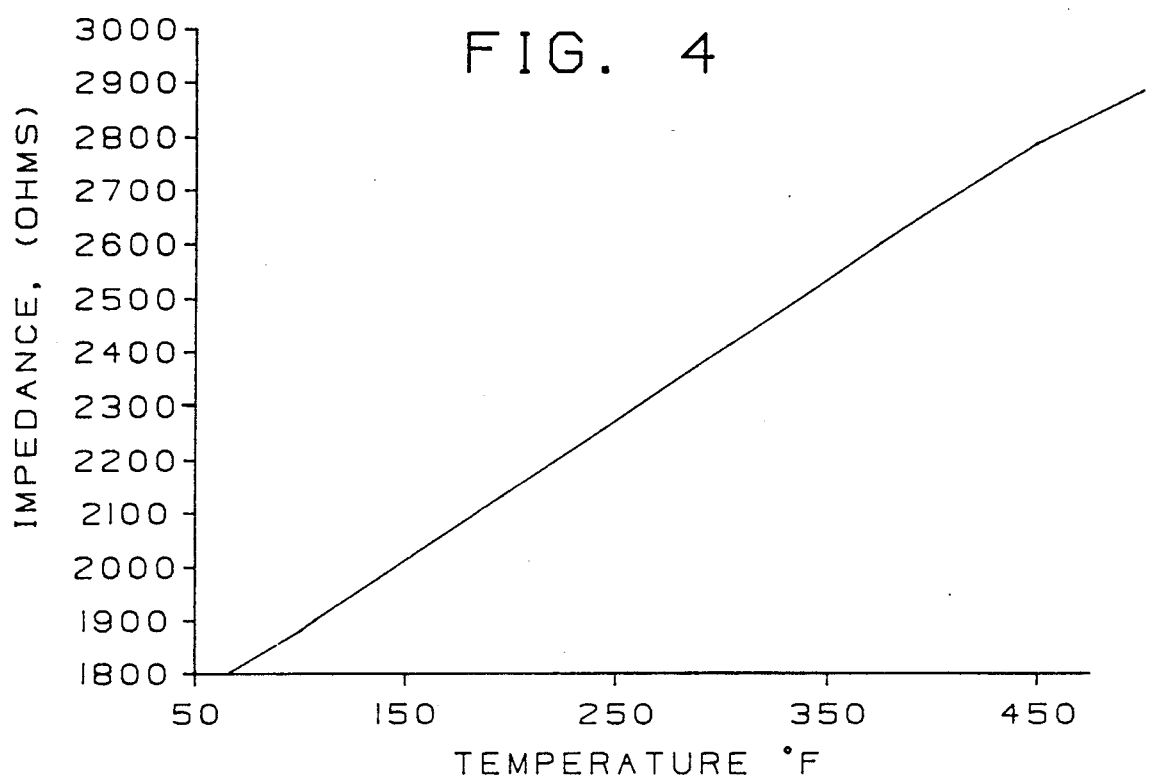
FIG. 4 is a graphical representation of the relationship of resistance and temperature for the low temperature sensor configuration for the sensor of FIG. 2.

The first sensor configuration comprises strip 14 itself. In this configuration the resistance of strip 14 between pads 14(a)' and 14(b)' is measured to obtain temperature information. Substrate 12 merely serves as a support structure for conductive strip 14. The resistance versus temperature curve for strip 14 is shown in FIG. 4. This sensor works particularly well for temperatures in the 100°–450° F. temperature range.

Figure 5:
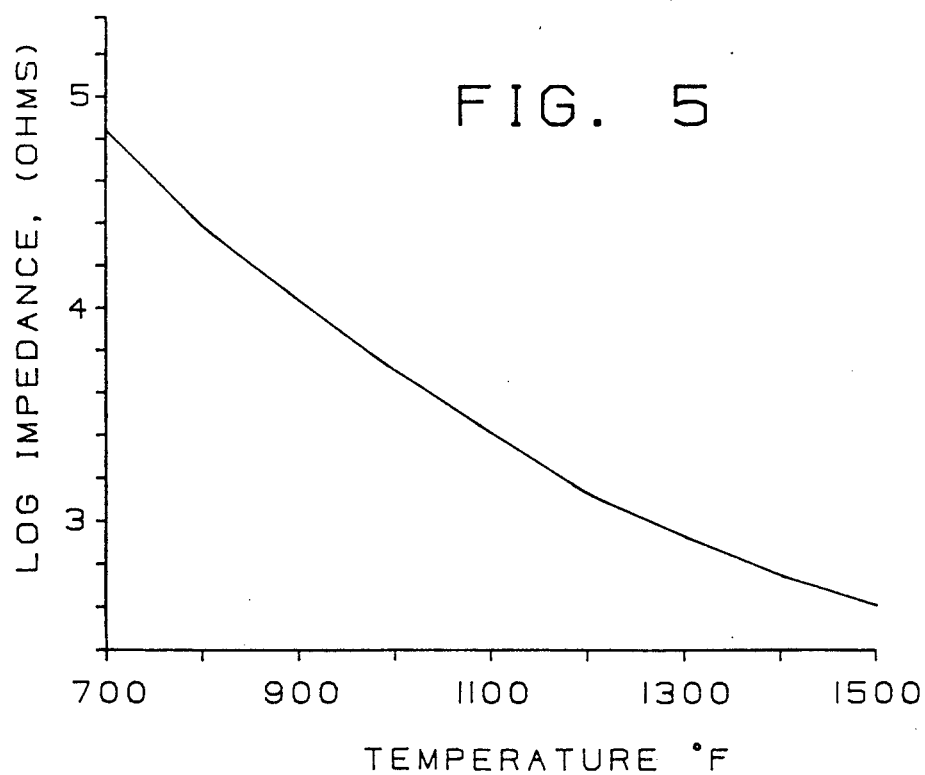
FIG. 5 is a graphical representation of the relationship of resistance and temperature for the high temperature sensor configuration for the sensor of FIG. 2.

A second sensor configuration uses strip 14 in combination with strip 16 and substrate 12 to provide temperature information as a function of the resistance of glass ceramic substrate 12 between strips 14 and 16, which is essentially the surface resistance of the glass ceramic material. The temperature vs resistance characteristics for this sensor configuration, illustrated in FIG. 5, suggests this configuration is best suited for use in the relatively high temperature range of 750°–1500° F.

Figure 6:
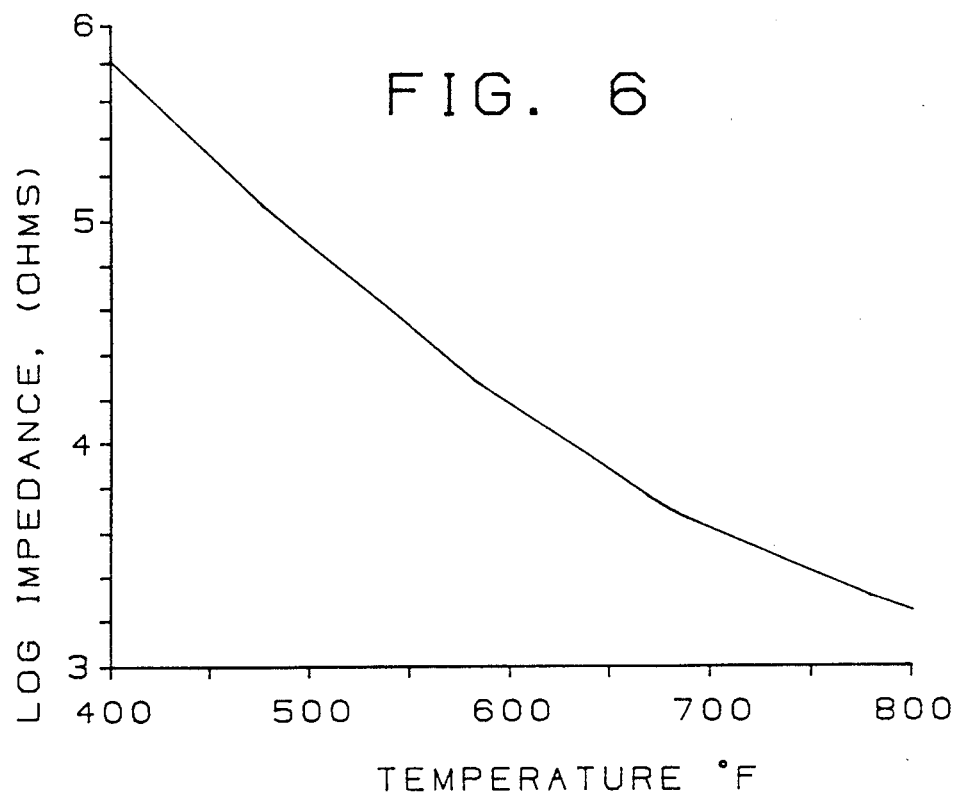
FIG. 6 is a graphical representation of the relationship of resistance and temperature for the intermediate temperature sensor configuration for the sensor of FIG. 2.

A third sensor configuration comprising the combination of strips 14 and 18 and glass-ceramic substrate 12 measures the temperature in the range generally between the aforementioned low and high temperature ranges (i.e. 450° F.–750° F.). This combination provides temperature information as a function of the bulk resistance of the glass-ceramic substrate, i.e. the resistance presented by the thickness of the glass-ceramic material between strips 14 and 18. The resistance vs. temperature characteristic of the glass-ceramic material between strips 14 and 18 is illustrated in FIG. 6.

Figure 7:
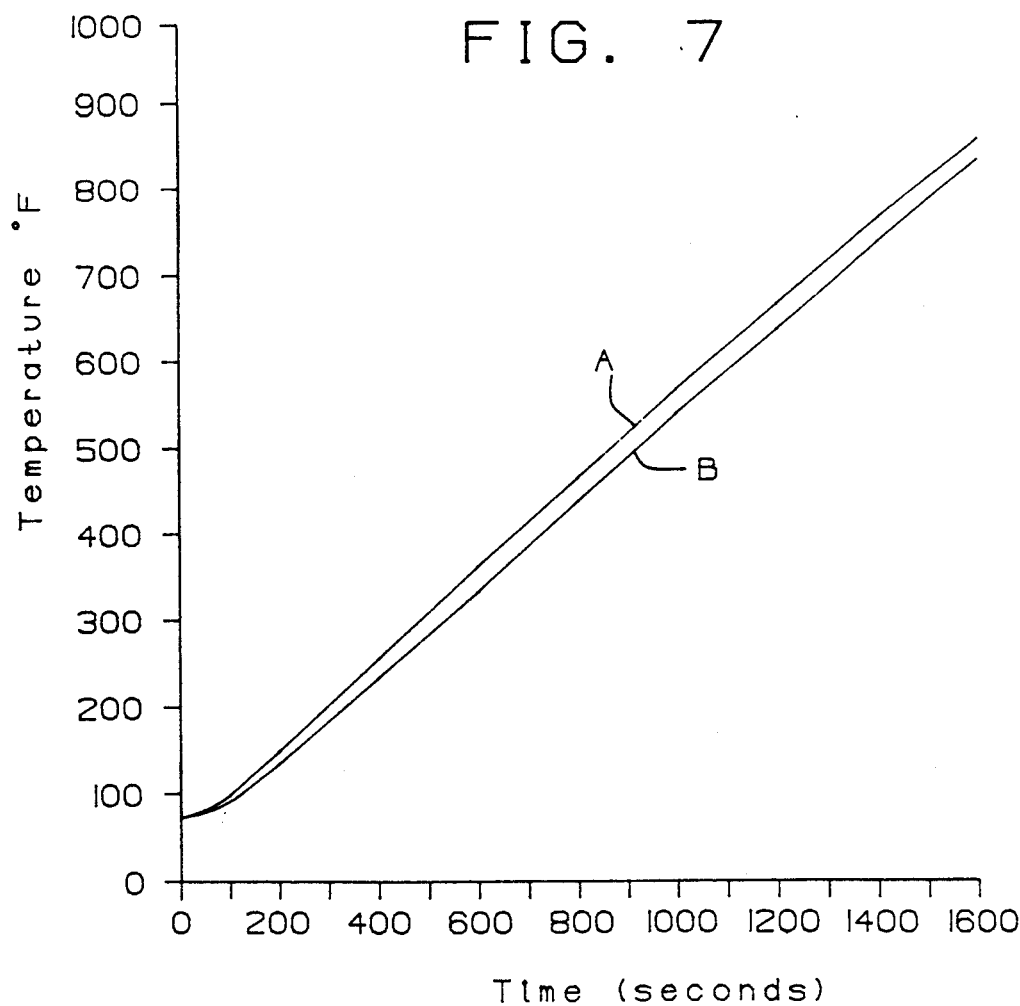
FIG. 7 is a graphical representation illustrating the actual oven temperature and the temperature as measured by the sensor of FIG. 2 as a function of time.

As hereinbefore described, for operating temperatures in the intermediate and high temperature portions of the operating range (450°-1500° F.) the temperature is measured as a function of the resistance of the glass-ceramic material. As a relatively poor conductor of heat, the glass-ceramic material is characterized by thermal inertia, i.e. the temperature of substrate 12 responds relatively slowly to changes in oven temperature. As used herein, the term thermal inertia refers to this sluggish response of the temperature of the substrate to changes in the oven temperature. As a consequence of the thermal inertia which characterizes substrate 12, the temperature sensed by the sensor tends to lag the actual ambient temperature in the oven during transient operating conditions which exist following turning the oven on or changing the selected temperature set point. This characteristic is illustrated by the curves of FIG. 7. Curve A represents the actual ambient temperature in the oven as a function of time as the oven heats from room temperature to the self-clean temperature.

Curve B represents the temperature in the oven as measured by sensor 10. As these curves show, the lag is relatively constant on the order of approximately 30 degrees except at the low end of the operating range. This lag introduces error into the system during the transition from a relatively low set point including OFF to a relatively high set point which could result in undesirable overshoot.

In accordance with the present invention, the control system is provided with compensating means operative to adjust the sensed temperature value in response to changes in set point temperature to compensate for the thermal lag of the sensor.

As will be hereinafter described in greater detail, the control system includes control means operative to control energization of the oven as a function of the set point temperature selected by user manipulation of user input means comprising keyboard 8 (FIG. 1) and a temperature control variable which represents the temperature of the oven. Under steady state operating conditions, that is under conditions during which the temperature in the oven has closely approached or exceeded its set point temperature, the control variable is set equal to the temperature input from sensor 10. However, during transient periods following a change in set point temperature, continuing until the temperature in the oven closely approaches the new set point temperature, the compensating means adjusts the control variable to a value different from the temperature value indicated by sensor 10 to compensate for the thermal lag of sensor 10.

As hereinbefore described with reference to the temperature time curves of FIG. 7, the lag results in a relatively constant temperature differential between the actual temperature and the temperature derived from sensor 10 throughout most of the operating range during a heat up period. In the illustrative embodiment, this differential is approximately 30° F. To compensate for this 30° F. lag, the compensating means changes the value represented by the variable utilized by the control to represent the sensed temperature for control purposes. Specifically, the value of this variable, designated the temperature control variable, is increased to an adjusted value to establish a predetermined differential between the temperature control variable and the sensed temperature. By this arrangement under transient operating conditions the value of the temperature control variable exceeds the sensed temperature, that is the signal representing temperature derived directly from sensor 10 by a predetermined amount, which in the illustrative embodiment is 30° F.

The maximum differential is achieved by simply adding 30° F. to the sensed temperature. However, it is desirable, particularly in application requiring relatively tight temperature control, to gradually adjust the value of the control variable to establish the desired differential between the adjusted value of the temperature control variable and the actual sensor input temperature. The gradual increase to this differential is achieved by incrementally increasing the amount added to the sensed temperature at a constant rate for a predetermined period of time. In the illustrative embodiment the value added to the sensed temperature value is increased at a rate of 0.48° F. per second for period of 62.5 seconds. Thereafter, the control variable is then set equal to the sensed temperature plus 30° F. until the value of the control variable first exceeds the set point temperature. Upon first exceeding the set point temperature the value added to the sensed temperature is gradually decreased at a constant rate greater than the increase rate for a shorter predetermined time which in the illustrative embodiment is 0.6/sec for 50 seconds. By this arrangement during the first 62.5 seconds following an increase in the set point temperature, the control variable is gradually increased until a 30° F. differential is established between the control variable and the sensed temperature. This differential is gradually decreased to zero during the 50 second period immediately after the control variable first exceeds the new set point value. These rates have been empirically determined to provide a satisfactory transition to the adjusted value at the beginning of a transient period and back to the sensed temperature value at or near the end of the transition period following a change in set point for the oven. It will be appreciated that these parameters are intended merely to illustrate but not limit the invention.

Figure 8:
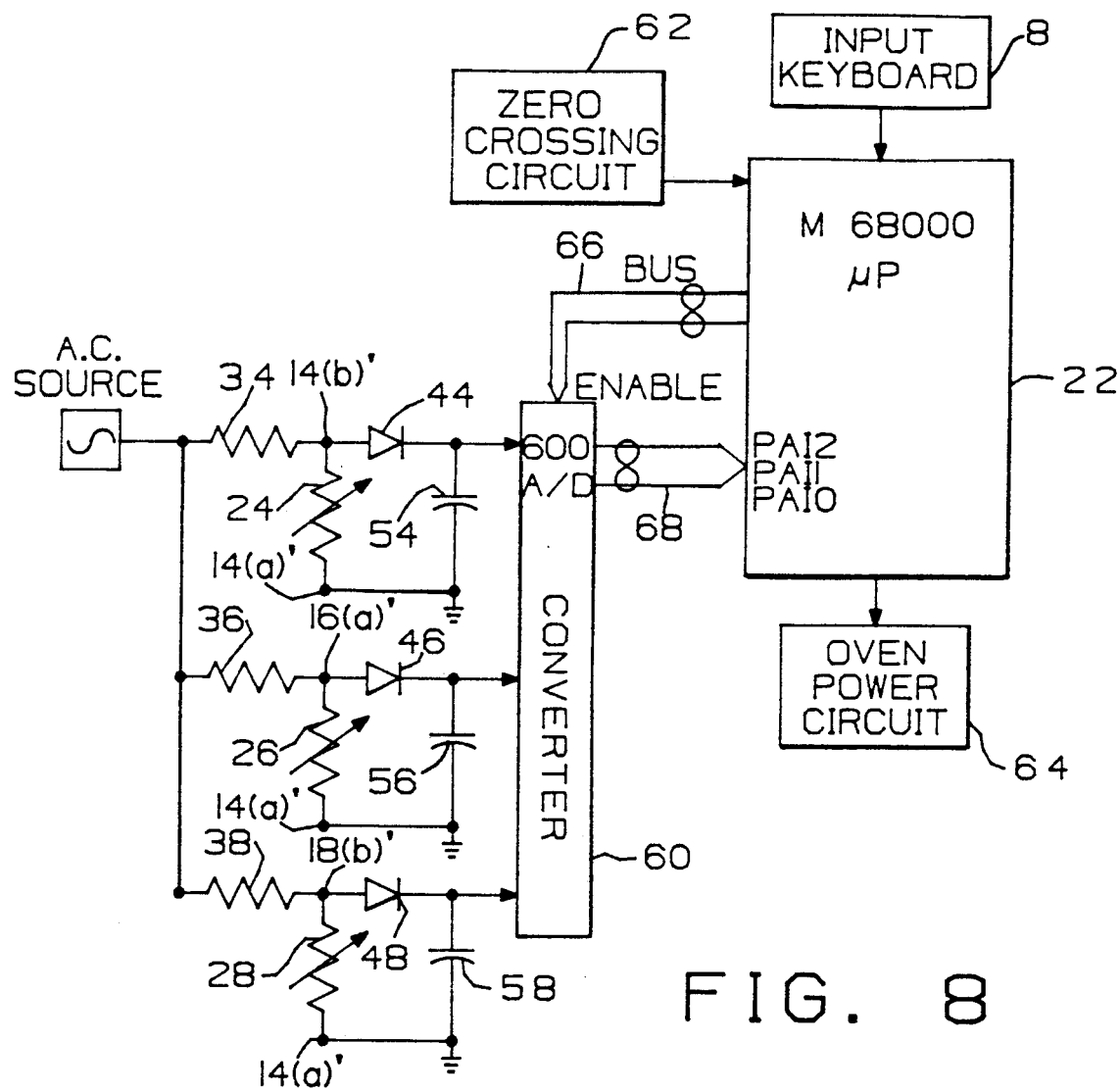
FIG. 8 is a simplified schematic circuit diagram for an oven control circuit incorporating the sensor of FIG. 2.

Illustrative external control circuitry for controlling the temperature in the cooking oven of the range of FIG. 1 embodying a control system in accordance with the present invention is schematically illustrated in FIG. 8. Power control is provided electronically by microprocessor 22. Microprocessor 22 is a Motorola 68000 series microprocessor programmed to operate as a virtual memory machine, with its read only memory (ROM) permanently configured to implement a predetermined set of instructions to control oven temperature as a function of temperature information received from sensor 10 in accordance with the present invention. Each of the three temperature sensor configurations for sensor 10 is represented in the circuit of FIG. 8, as a variable resistor. Resistor 24 represents the low temperature configuration comprising the resistance of strip 14 between terminal pads 14(a)' and 14(b)'. Resistor 26 represents the high temperature configuration comprising the resistance between strips 14 and 16, as measured between pads 14(a)' and 16(a)'. Resistor 28 represents the intermediate temperature configuration comprising the resistance between strips 14 and 18 as measured between pads 14(a)' and 18(b)'.

An AC drive is necessary for the sensor configurations which use the resistance of the glass to prevent polarization of the glass which would eventually occur if the dc source were to be applied. The drive circuit for each of the sensor configurations comprises a 5 volt, 60 Hz, AC supply 30 which is coupled to resistances 24, 26 and 28 via current limiting resistors 34, 36 and 38 respectively, at contact pads 14(b)', 16(a)' and 18(b)' respectively. The resistance value for each of resistors 34, 36 and 38 is 2000 ohms. Diodes 44, 46 and 48 and 10 uf capacitors 54, 56 and 58 respectively rectify and smooth the AC signal appearing at terminal pads 14(b)', 16(a)' and 18(b)' for input to A/D converter 60. Converter 60 is a Motorola 600 A/D converter circuit.

Converter circuit 60 converts the analog voltage signals from sensor resistances 24, 26 and 28 to digital signals for input to microprocessor 22.

Enable signals from microprocessor 22 for sequentially enabling the input from each sensor configuration are coupled to converter 60 via bus 66. The converted output for the enabled sensor is then coupled by bus 68 to microprocessor 22 for storage at the corresponding one of the three memory locations PAI0, PAI1 and PAI2 for resistances 24, 26 and 28 respectively. By this arrangement the temperature sensed by each sensor configuration is periodically stored in the microprocessor memory.

Microprocessor 22 generates power control signals for oven power circuit 64 as a function of the sensed temperature derived from sensor 10 represented by resistors 24, 26 and 28 and the set point temperature from keyboard 8. Power circuit 64 essentially comprises power switches for selectively coupling and decoupling the oven heating elements and the 60 Hz, AC domestic power supply. This can be achieved in conventional fashion using well-known switching devices such as power control relays.

Conventional zero crossing detection circuit 62 provides signals to microprocessor 22 marking zero crossings of the standard 120 volt, 60 Hz domestic power signal. The zero crossing signals are used to synchronize execution of the control program of microprocessor 22, which in the illustrative embodiment is cycled through once during each half-cycle of the 60 Hz power signal.

Figure 9:
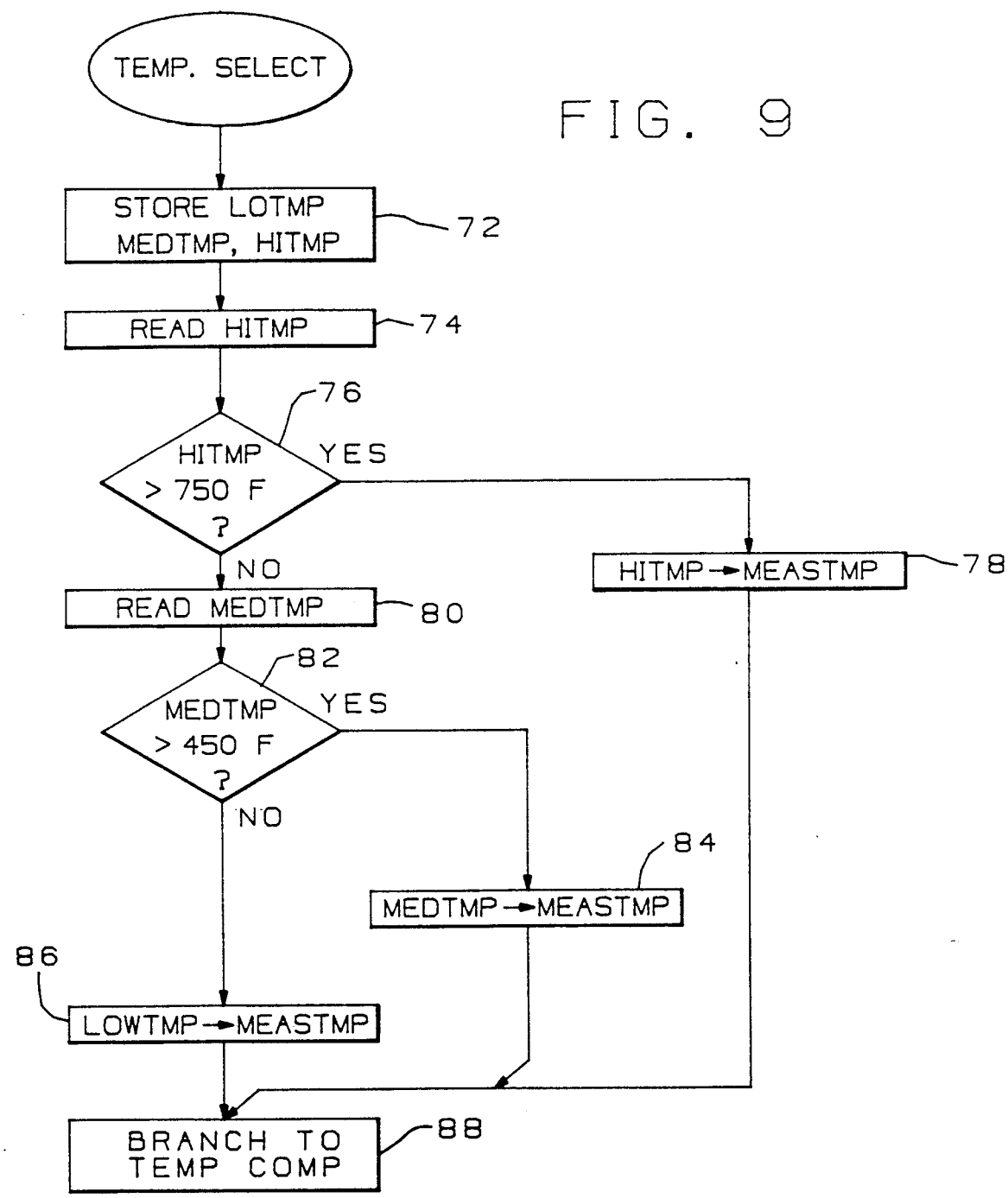
FIG. 9 is a flow diagram of the Temp Select routine incorporated in the control program for the microprocessor in the circuit of FIG. 8.
Figure 10:
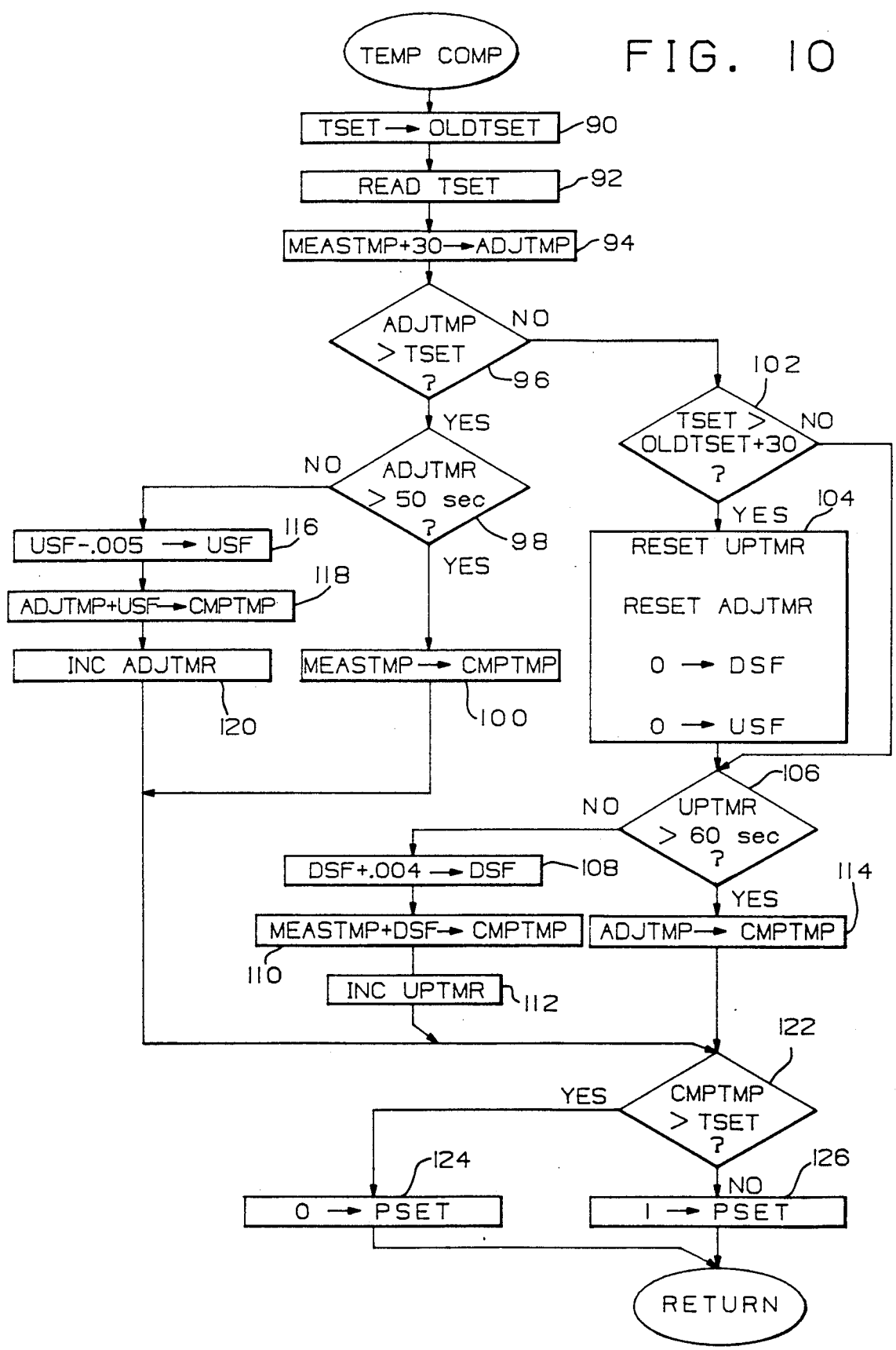
FIG. 10 is a flow diagram of the Temp Comp routine incorporated in the control program for the microprocessor in the circuit of FIG. 8.

Subroutines illustrated by the flow diagram of FIGS. 9 and 10 are included in the control program for microprocessor 22. FIG. 9 illustrates a flow diagram for the Temp Select control routine which enables microprocessor 22 to read in and store temperature sensor input signals and select the particular one of the three stored values to be used for the next power control decision. FIG. 10 illustrates a flow diagram for the Temp Comp routine which provides the compensating means for adjusting the control variable to compensate for the thermal inertia of sensor 10 in response to a change in set point. From these diagrams one of ordinary skill in the programming art could prepare a set of instructions for permanent storage in the ROM of microprocessor 22 which would enable the microprocessor to implement these routines. It will be appreciated that other sub-routines for performing additional control functions for the appliance would be included in the control program as well.

More specifically, the Temp Select routine (FIG. 9) selects the appropriate one of the three temperature inputs obtained from the three sensor configurations of sensor 10 according to the temperature then being sensed, by first testing the input from the high temperature configuration. If this input represents a temperature greater than 750° F., it is used as the operative sensor input value; if not, the input from the intermediate range configuration is tested. If the input from the intermediate range sensor is greater than 450° F., it is used as the operative sensor input value; if not, the value from the low temperature configuration is used as the operative sensor input value.

Referring now to the flow diagram of FIG. 9, on entering this routine the program stores the three sensor input signals sequentially received via bus 68 at memory locations PAI0, PAI1 and PAI2. The information stored at each of these locations is designated HITMP, MEDTMP and LOTMP respectively (Block 72). The signal stored at PAI0 corresponding to the output from the high temperature sensor configuration designated HITMP is read first (Block 74). If the sensed temperature is greater than 750° F. (Yes at Inquiry 76) this value is stored as the operative sensor input variable designated MEASTMP (Block 78). Returning to Inquiry 76, if the output from the high temperature sensor configuration is less than 750° F., the output stored at PAI1 representing the output from the intermediate temperature sensing configuration represented by the variable MEDTMP is read (Block 80) and compared to 450° F. (Inquiry 82); if greater, MEDTMP is stored as MEASTMP (Block 84); if less, the output from the low temperature sensor configuration designated LOTEMP stored at PAI2 is stored as the operative temperature variable MEASTMP (Block 86). Having established a value for the operative sensor input, MEASTMP, the program branches to the Temp Comp routine of FIG. 10.

The primary function of the Temp Comp routine is to provide compensating means operative to increase the temperature control variable designated CMPTMP in the control routine of FIG. 10, to an adjusted value which establishes the predetermined differential between the temperature control variable and the sensed input temperature value established in the Temp Select routine. The control variable is increased at a predetermined constant rate in response to a change in set point which initiates a transient operating condition. As the transient period ends, i.e. as actual temperature approaches the set point, the compensating means is operative to gradually reduce the control variable from the adjusted value back down to the sensed temperature value. In order to prevent the compensating means from introducing additional overshoot error into the system, the compensating means only operates to adjust the value of the control variable in response to changes in set point greater than a predetermined value which in the illustrative embodiment is 30° F., the approximate amount the sensor tends to lag the temperature when responding to substantial changes in setting.

The compensation functions are performed in the Temp Comp routine by adding a variable designated DSF to the sensed temperature MEASTMP during each pass through the routine during the 60 second period following the detection of an increase in the set point temperature of more than 30° F. DSF is increased by 0.004° F. during each pass through the control routine period of 60 seconds following detection of an increase in set point of more than 30° F. This effectively adjusts the control variable, CMPTMD to a value 30° F. higher than the sensed temperature MEASTMD at the end of the 60 second period corresponding to a rate of increase of 0.48° F. per second. At end of the 60 second period, the control variable remains 30° F. higher than the sensed value until the control variable exceeds the set point temperature at which time CMPTMD is gradually decremented by 0.005 degrees during each pass through the routine for the next 50 seconds, thereby decrementing the control variable by 30° F. at a constant predetermined rate of 0.6° F./sec.

Referring now to the flow diagram of FIG. 10, TSET represents the user selected set point temperature. On entering the routine the value of TSET from the previous pass through the control program is stored as the variable OLDTSET (Block 90) and the current input from keyboard 8 is stored as TSET (Block 92). Next a variable designated ADJTMP is set equal to the sensed temperature MEASTMP plus 30° F. Next Inquiry 98 compares ADJTMP to the current temperature set point value. Under steady state conditions ADJTMP will be greater than the set point and the timer ADJTMR as hereinafter described will be greater than 50 seconds as determined by Inquiry 98. Under such steady state conditions no compensation is needed and the temperature control variable designated CMPTMP is simply set equal to the sensed temperature MEASTMP (Block 100).

Referring again to Inquiry 96, if ADJTMP is not greater than TSET either a new set point has just been selected or a transient mode is in progress. Inquiry 102 determines if the current set point TSET exceeds the previous set point OLDTSET by more than 30° F. If so, a timer designated UPTMR which controls the incrementing of the temperature control variable, and a timer designated ADJTMR which controls the decrementing of the control variable, are reset and variables USF and DFS are initialized to 0 (Block 104), to initiate the compensating process. If not, a transient period is already in progress. In either event, the program proceeds to Inquiry 106 which checks to see if UPTMR has timed out. If not, signifying that the control variable is being gradually increased to the adjusted value 30° F. above the sensed temperature value, variable DSF is incremented by 0.004 seconds (Block 108). Next, the temperature control variable CMPTMP is set equal to the MEASTMP plus DSF (Block 110) and UPTMR is incremented (Block 112). If UPTMR has timed out, the gradual increase is complete and the control variable is simply set equal to ADJTMP (Block 114) which equals the sensed temperature plus 30° F. (see Block 94).

Referring again to Inquiry 96, the transient period essentially ends when the variable ADJTMP first exceeds the set point value, TSET. It will be recalled that at the beginning of the transient period, timer ADJTMP and variable USF were set to zero (Block 104). Thus, for 50 seconds after ADJTMP first exceeds TSET, Inquiry 98 directs the program to Block 116 where USF is decremented by 0.005° F. each pass. This increasingly negative value is added to ADJTMP effectively reducing it by 0.005° F. The control variable CMPTMP is set equal to this value (Block 118), and timer ADJTMR is incremented (Block 120). After 50 seconds, ADJTMR times out (Inquiry 98) and control variable CMPTMP is again set equal to the sensed temperature MEASTMP (Block 100).

Having established the appropriate value for the temperature control variable, a power control decision is made at Inquiry 122 as a function of the control variable and the set point by comparing the temperature control variable to the set point temperature. If greater, a variable designated PSET is set to zero (Block 124); if less PSET is set to one (Block 126). PSET is used in the power control sub-routine (not shown). The power control routine may be a simple ON/OFF arrangement in which when PSET equals one, the oven is energized and when PSET equals zero the oven is not energized.

While in accordance with the Patent Statutes a specific embodiment of the present invention has been illustrated and described herein, it is realized that numerous modifications and changes will occur to those skilled in the art. For example, the embodiment herein described is a control system for a domestic self-cleaning oven. However, it will be appreciated that such a control system could be adapted for use in a variety of other applications utilizing a sensor characterized by thermal inertia as well, with compensation parameters selected based upon the characteristics particular to the sensor being used. It is therefore to be understood that the appended claims are intended to cover all such modifications and changes as fall within the true spirit and scope of the invention.

What is claimed is:

1. In a temperature control system having input means for establishing the setpoint temperature for a controlled environment, and incorporating a temperature sensor characterized by thermal inertia which causes the sensed temperature to lag the actual oven temperature during the transition from one operating temperature for the controlled environment to a different operating temperature, the improvement comprising:

control means responsive to the input means and the temperature sensor means for controlling the temperature of the controlled environment, said control means being operative to control temperature as a function of the setpoint temperature and the value of a temperature control variable, the value of said temperature control variable being set equal to the temperature sensed by the sensor during steady state operating conditions;

said control means including compensating means operative in response to a change in setpoint temperature to adjust the value of said temperature control variable from the sensed temperature value to an adjusted value to compensate for the thermal lag of said sensor;

whereby said control means controls the temperature of the controlled environment as a function of the actual sensed temperature under steady state operating conditions and as a function of a temperature value adjusted to compensate for the thermal lag inherent in the temperature sensing means in response to a change in setpoint temperature.

2. A temperature control system in accordance with claim 1 wherein said control means further comprises means for comparing a new set point temperature setting with the previous set point temperature setting and wherein said compensating means is operative to initiate an adjustment of said temperature control variable only when said comparing means detects an increase in set point temperature greater than a predetermined threshold increase, whereby for relatively small changes in set point temperature the actual sensed temperature value is used for controlling energization of the range, rather than an adjusted value.

3. A temperature control system in accordance with claim 2 wherein said compensation means adjusts said temperature control variable by gradually increasing the value of said temperature control variable at a constant predetermined rate to an adjusted value which establishes a predetermined differential between the adjusted value and the sensed temperature value to compensate for the thermal lag of said sensor.

4. A temperature control system in accordance with claim 3 wherein said compensating means gradually decreases the value of said temperature control variable at a predetermined constant rate greater than said predetermined increase rate when the value of said temperature control variable exceeds the new setpoint value to compensate for the thermal lag of the sensor.

5. A control system in accordance with claim 4 wherein said temperature sensing means comprises a plurality of electrodes supported from a glass-ceramic substrate operative to sense temperature in the oven as a function of the resistance of said glass-ceramic substate.

6. In a temperature control system having input means for establishing the setpoint temperature for a controlled environment, and incorporating a glass-ceramic temperature sensor characterized by thermal inertia which causes the sensed temperature to lag the actual oven temperature during the transition from one operating temperature for the controlled environment to a different operating temperature for the controlled environment, the improvement comprising:
  control means responsive to the input means and the temperature sensor means for controlling the temperature of the controlled environment, said control means being operative to control temperature as a function of setpoint temperature and the value of a temperature control variable, the value of said temperature control variable being set equal to the temperature sensed by the sensor during steady state operating conditions;
  said control means including compensating means operative in response to an increase in setpoint temperature to gradually increase the value of the temperature control variable from the sensed temperature value to an adjusted value which establishes a differential between the adjusted value and the sensed temperature value to compensate for the thermal lag of said sensor;
  whereby said control means controls the temperature of the controlled environment as a function of the actual sensed temperature under steady state operating conditions and as a function of a temperature value adjusted to compensate for the thermal lag inherent in the temperature sensing means in response to a change in setpoint temperature.

7. The improved temperature control system of claim 6 wherein said compensating means is further operative to gradually decrease the value of the temperature control variable back to a value equal to the sensed temperature value when the value of the temperature control variable exceeds the setpoint temperature.

8. The improved temperature control system of claim 7 wherein said compensating means gradually increases the value of the temperature control variable at a constant predetermined rate to an adjusted value which establishes a predetermined differential between the adjusted value and the sensed temperature value by a predetermined amount to compensate for the thermal lag of said sensor.

9. The improved temperature control system of claim 8 wherein said compensating means gradually decreases the value of the temperature control variable at a predetermined constant rate greater than said predetermined increase rate.

10. In a temperature control system for a thermal oven of the type having user operable input means for establishing the setpoint temperature for the oven, and incorporating a glass-ceramic temperature sensor characterized by thermal inertia which causes the sensed temperature to lag the actual oven temperature during the transition from a lower setpoint temperature to a higher setpoint temperature, the improvement comprising:
  control means responsive to the input means and the temperature sensor means for controlling the temperature of the oven, said control means being operative to control oven temperature as a function of setpoint temperature and the value of a temperature control variable, the value of said temperature control variable being set equal to the temperature sensed by the sensor during steady state operating conditions;
  said control means including compensating means operative in response to an increase in setpoint temperature to increase the value of the temperature control variable from the sensed temperature value to an adjusted value which exceeds the sensed temperature value to compensate for the thermal lag of said sensor;
  whereby said control means controls the temperature in the oven as a function of the actual sensed temperature under steady state operating conditions and as a function of a temperature value adjusted to compensate for the thermal lag inherent in the temperature sensing means in response to an increase in setpoint temperature.

11. The improved temperature control system of claim 10 wherein said compensating means is further operative to gradually decrease the value of the temperature control variable back to a value equal to the sensed temperature value when the value of the temperature control variable exceeds the setpoint temperature.

12. The improved temperature control system of claim 11 wherein said compensating means gradually increases the value of the temperature control variable at a constant predetermined rate to an adjusted value which exceeds the sensed temperature value by a predetermined amount to compensate for the thermal lag of said sensor.

13. The improved temperature control system of claim 12 wherein said compensating means gradually decreases the value of the temperature control variable at a predetermined constant rate greater than said predetermined increase rate.

14. A temperature control system for a thermal oven comprising:
  user operable input means for selecting the setpoint temperature for the oven;
  temperature sensing means operative to generate a sensed temperature signal representative of the sensed temperature in the oven, said sensing means being characterized by thermal inertia causing the sensed temperature to lag the actual oven temperature during the transition from one oven operating temperature to a different oven operating temperature; and
  control means responsive to said input means and said sensor means for controlling temperature in the oven, said control means being operative to control energization of the oven as a function of said user selected setpoint temperature and the value of a temperature control variable, the value of said temperature control variable being set equal to the value represented by the sensed temperature signal during steady state operating conditions for the oven;

said control means including compensating means operative in response to an increase in setpoint temperature to gradually increase the value of the temperature control variable from the sensed temperature value to an adjusted value which exceeds the sensed temperature value by an amount sufficient to compensate for the thermal lag of said sensor, said compensating means being further operative to gradually decrease the value of the temperature control variable back to a value equal to the sensed temperature value when the value of the temperature control variable exceeds the setpoint temperature;

whereby said control means controls the oven temperature as a function of the actual sensed temperature under steady state operating conditions and as a function of a temperature value adjusted to compensate for the thermal lag inherent in the temperature sensing means in response to an increase in the setpoint temperature.

15. A temperature control system in accordance with claim 14 wherein said control means further comprises means for comparing a new set point temperature setting with the previous set point temperature setting and wherein operation of said compensation means is initiated only when said comparing means detects an increase in set point temperature greater than a predetermined threshold increase, whereby for relatively small changes in set point temperature the actual sensed temperature value is used for controlling energization of the range, rather than an adjusted value.

16. A temperature control system in accordance with claim 15 wherein said compensating means gradually increases the value of the temperature control variable at a constant predetermined rate to an adjusted value which exceeds the sensed temperature value by a predetermined amount to compensate for the thermal lag of said sensor.

17. A temperature control system in accordance with claim 16 wherein said compensating means gradually decreases the value of the temperature control variable at a predetermined constant rate greater than said predetermined increase rate.

18. A control system in accordance with claim 17 wherein said temperature sensing means comprises a plurality of electrodes supported from a glass-ceramic substrate operative to sense temperature in the oven as a function of the resistance of the glass-ceramic material.

19. A method of compensating for the thermal inertia of a glass-ceramic temperature sensor used as the temperature sensor in a temperature control system which controls the temperature of the controlled environment as a function of the set point temperature for the controlled environment and the value of a temperature control variable representing the temperature being controlled, said method comprising the steps of:

setting the temperature control variable equal to the sensed temperature value derived from the temperature sensor when operating in the steady state mode, as signified by the difference between the set point temperature and the sensed temperature value being less than a predetermined amount for a predetermined period of time;

monitoring changes in set point temperature to the detect an increase in set point temperature greater than a predetermined threshold amount signifying the initiation of operation in a heat up mode;

upon detection of an increase in set point temperature greater than said threshold amount, adjusting the value of the temperature control variable by gradually increasing its value from the actual sensed temperature value to an adjusted value which exceeds the sensed temperature value by an amount sufficient to compensate for the thermal lag of the temperature sensor; and when the adjusted value of the temperature control variable exceeds the set point temperature marking the end of operation in the heat up mode, gradually decreasing the value of the temperature control variable until it returns to the actual sensed temperature value.

20. The method of claim 19 wherein the controlled environment is a thermal oven.

21. The method of claim 20 wherein the value of the temperature control variable is increased at a predetermined constant rate to a value which exceeds the sensed temperature by a predetermined amount.

22. The method of claim 21 wherein the value of the temperature control variable is decreased at a predetermined constant rate which is greater than the predetermined increase rate.

* * * * *

UNITED STATES PATENT AND TRADEMARK OFFICE
CERTIFICATE OF CORRECTION

PATENT NO. : 5,026,971

DATED : 6/25/91

INVENTOR(S) : Thomas R. Payne and John Schultz

It is certified that error appears in the above-identified patent and that said Letters Patent is hereby corrected as shown below:

Column 14, Line 22, delete "the".

Signed and Sealed this

Twelfth Day of January, 1993

Attest:

DOUGLAS B. COMER

Attesting Officer

Acting Commissioner of Patents and Trademarks